C. BACHMANN.
BEEHIVE.
APPLICATION FILED MAR. 23, 1914.
1,103,468.
Patented July 14, 1914.
3 SHEETS—SHEET 1.
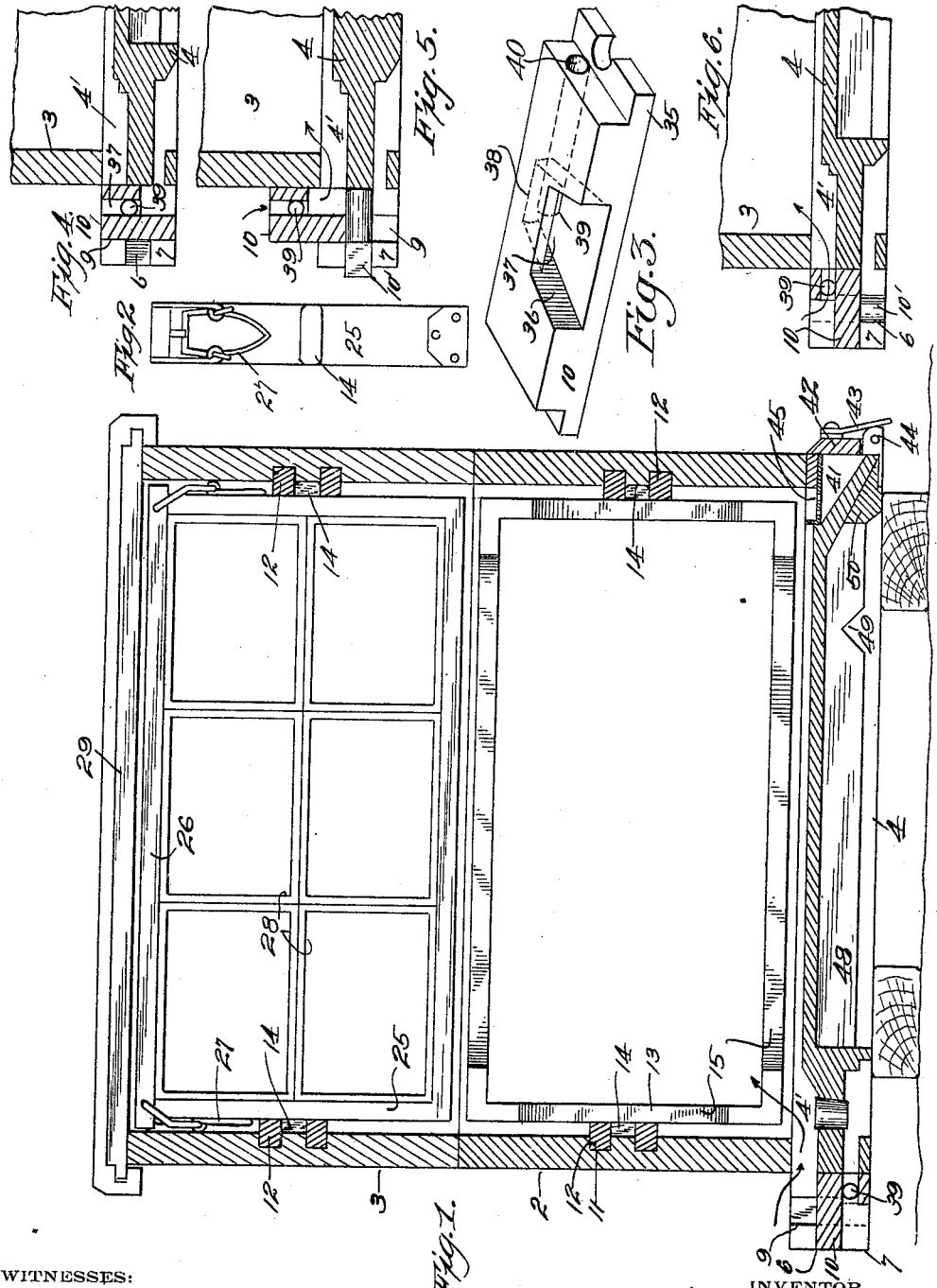
WITNESSES:
F. E. Maynard
Irvine Sinnett
INVENTOR
Christof Bachmann,
BY G. H. Strong
ATTORNEY C. BACHMANN.
BEEHIVE.
APPLICATION FILED MAR. 23, 1914.
1,103,468.
Patented July 14, 1914.
3 SHEETS—SHEET 2.
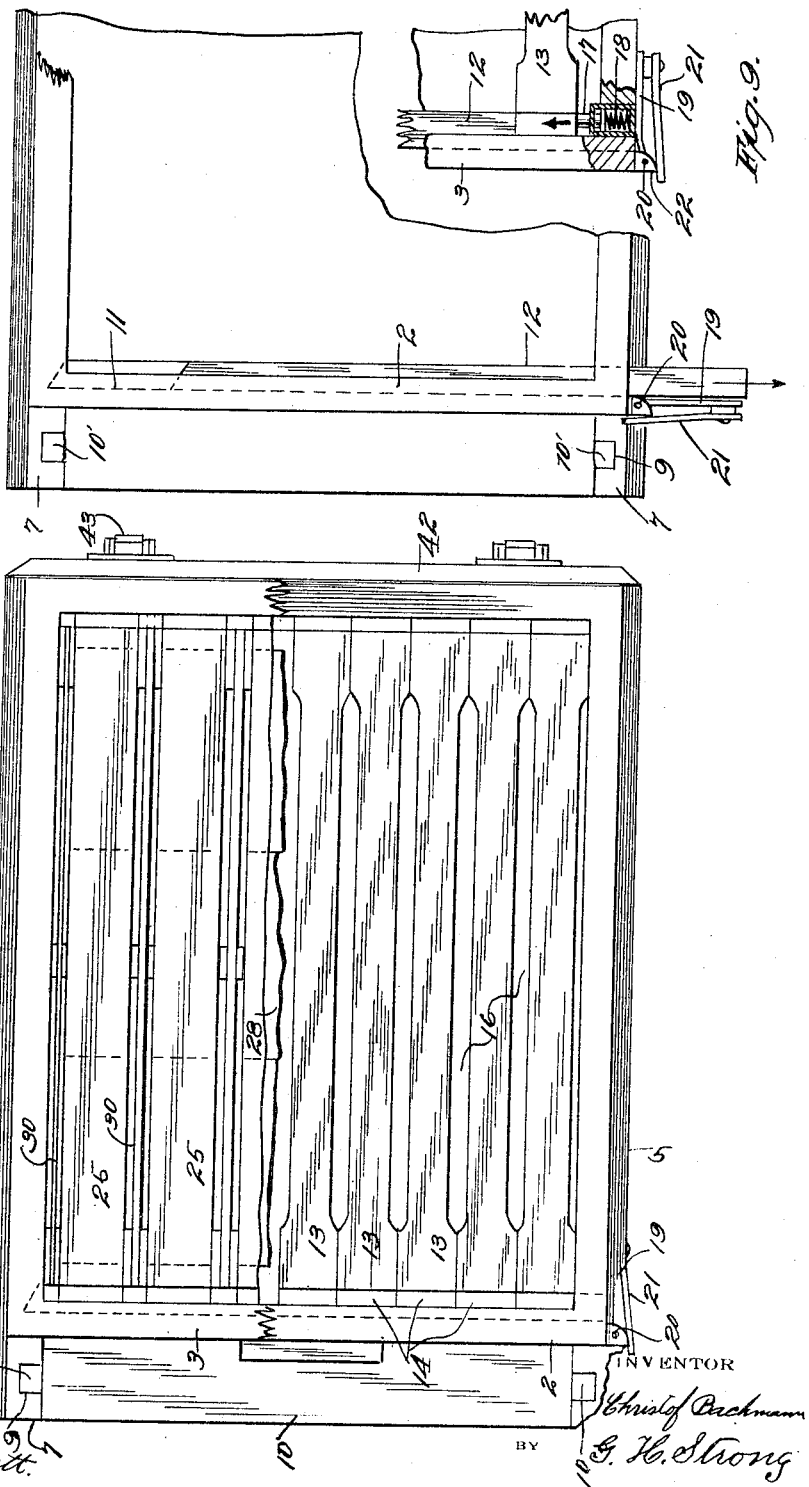

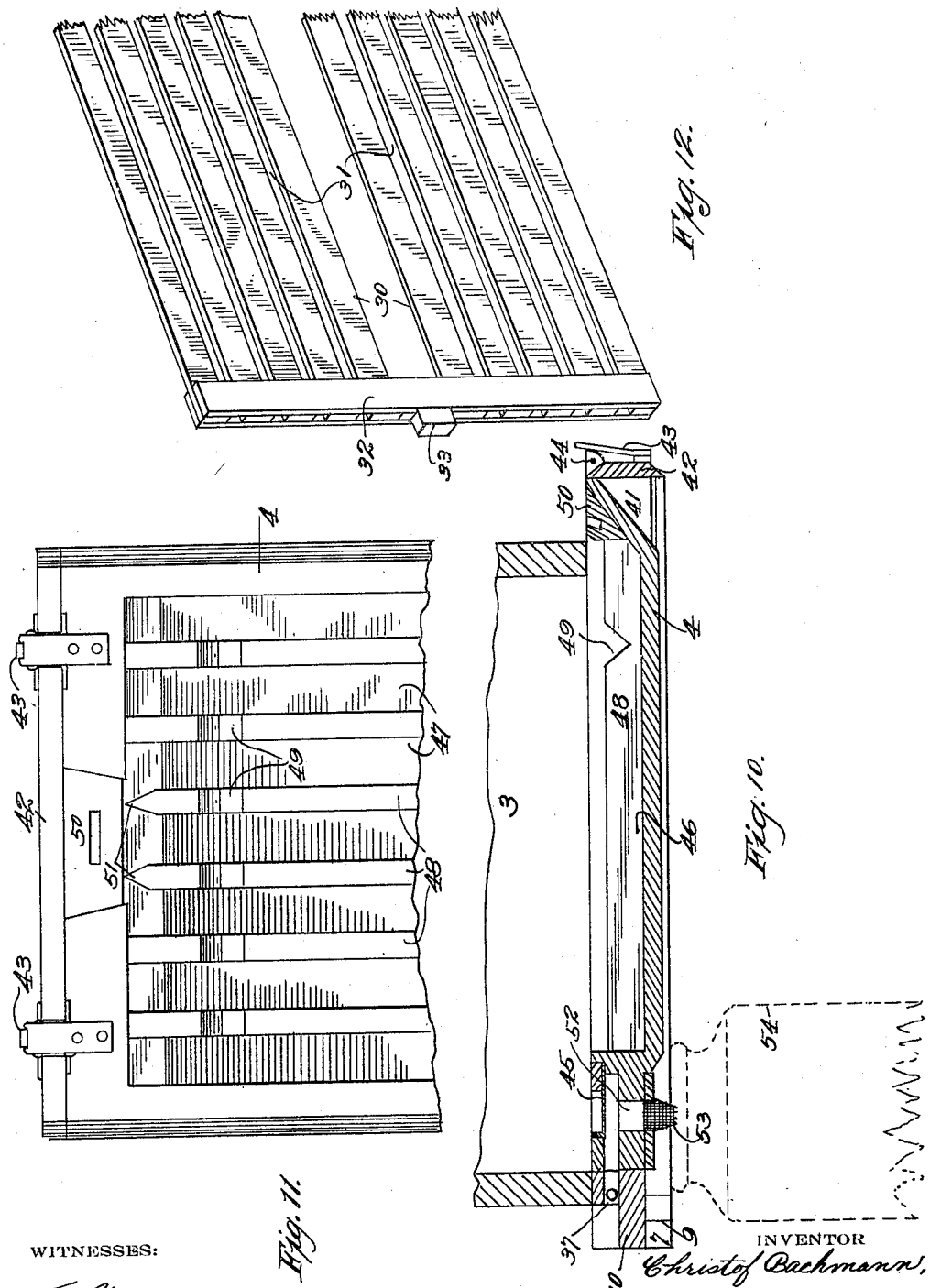

UNITED STATES PATENT OFFICE.

CHRISTOF BACHMANN, OF BAGBY, CALIFORNIA.

BEEHIVE.

1,103,468.                    Specification of Letters Patent.    Patented July 14, 1914.

Application filed March 23, 1914. Serial No. 826,520.

*To all whom it may concern:*

Be it known that I, CHRISTOF BACHMANN, a citizen of the United States, residing at Bagby, in the county of Mariposa and State of California, have invented new and useful Improvements in Beehives, of which the following is a specification.

This invention relates to beehives.

It is an object of the present invention to provide a substantial, sectionally constructed beehive, with its several parts so designed as to coöperate, when adjusted in different combined positions, to afford a practicable and safe beehive both for summer and for winter use.

It is a further object of the invention to provide a beehive structure comprising main box or chamber sections which are readily reversible and are provided with removable keys upon which the comb-section holding frames are supported, when mounted in the chambers, and which may be partially or entirely withdrawn for the ready removal of any of the section holders, as desired, without disturbing other holders.

It is also an important object of the present invention to provide a novel closure or gate for beehives, which is so designed as to be adjusted in diverse positions with relation to the inlet opening of the beehive, so that very accurate control of egress from and ingress to the beehive may be had, this gate being so designed as to provide the desired regulation.

Another object of the invention is to provide a floor, in combination with the beehive chambers, which is reversible end for end and side for side, the ends being designed to provide for ingress to and egress from the beehive, and being further provided with feed stalls on one side which may be utilized, as required, for supplying the bees with food by so adjusting the bottom that the feed stalls will open upwardly into the beehive.

The invention consists of the parts and the construction and combination of parts as hereinafter more fully described and claimed, having reference to the accompanying drawings, in which—

*Sheet No. 1.*—Figure 1 is a longitudinal vertical section through the beehive. Fig. 2 is an end view of one of the comb-section holders. Fig. 3 is a perspective view of the reversible gate. Fig. 4 shows the gate adjusted as a closure over the entrance of the beehive. Fig. 5 shows the gate adjusted as a blind over the beehive. Fig. 6 shows the gate adjusted over the entrance of the beehive to reduce the entrance area.

*Sheet No. 2.*—Fig. 7 is a plan view of the beehive, with the top removed and showing the brood chamber frames in plan and a portion of the honey chamber holders in plan. Fig. 8 is a detail of one end of the beehive, showing a key partly withdrawn. Fig. 9 is a detail of a corner of the beehive, showing the pressure device for holding the beehive frames steady.

*Sheet No. 3.*—Fig. 10 is a longitudinal vertical section through the beehive, showing the bottom adjusted for feeding position. Fig. 11 is a plan view of one end of the feed trough. Fig. 12 is a perspective view of one of the baffle partitions.

The present beehive is composed of a multiplicity of superposed box-like sections 2 and 3, of suitable proportions and size, open at the top and bottom and being adjustable in vertical alinement upon a bottom 4 which may be positioned as desired in actual use in the field. The bottom 4 is shown as being longer and wider than the beehive boxes 2—3; the longitudinally projecting edges being beveled, as at 5—5, to shed water. The forward portion of the bottom 4 is provided with mortised grooves 6, in the forwardly projecting ends 7, Fig. 8, which projecting ends 7 are provided with vertical slots 9, into which may be adjusted in one or any of several positions a gate 10 for a purpose which will be hereinafter described.

The inner surfaces of the end walls of the beehive boxes 2—3 are transversely grooved or mortised, as at 11, to receive removable keys 12 sufficiently spaced apart to support independent beehive frames 13, on the outer side of the ends of which are provided lugs 14 adapted to rest upon and between the keys 12 at each end of the hive boxes. The lowermost chamber 2 of the beehive is ordinarily known as the "brood chamber." In this brood chamber may be mounted, in vertical order, a suitable number of rectangular frames 13, the longitudinal and end edges of which are chamfered, as at 15, so that when the frames 13 are abutted at their corners, passageways 16 (Fig. 7) are formed through which the bees may pass to other portions of the beehive. The sections 2—3, as before stated, are reversible end for end and side for side, and when it is desired to insert or remove the beehive frames 13, it is only necessary to draw out the upper keys 12 of a box section so that the frames may be lifted vertically from the lower or supporting keys.

In order to firmly hold the inserted beehive frames 13 in position in the beehive boxes a suitable device, shown in Fig. 9, is employed which consists of a plunger 17 reacted upon by a spring 18 to force the several frames 13 into snug engagement. In this figure there is shown in detail a latch structure consisting of a plate 19 hinged at 20, which plate is adapted to swing over the pressure device 18 and also over the outer ends of the keys 12 of the beehive box section 2. The latch 19 is provided with a resilient arm 21, the free end of which bears upon a shoulder 22, adjacent to the pivot 20, and which operates to hold the latch 19 either in the closed position (Fig. 9) or in the open position shown in Fig. 8 when it is desired to remove any of the keys 12 from the mortise slots or seats 11.

The upper hive box or section 3 is similar to the lower section, as before stated. In this upper section there is removably mounted upon the keys 12 a holder 25 which comprises a rectangular frame with a removable side member 26. The member 26 is provided with suitable fastening hooks or devices 27, at the ends, whereby the removable side 26 is securely and readily attached to or removed from the complementary portion of the holder frame 25. Within the holder 25 may be adjusted suitable comb frames 28 in which the bees will store honey; these frames being readily removed, without the immediate application of any tools, by simply unfastening the locks 27 and releasing the side 26 from the holder 25, which latter is provided, at the ends, with lugs 14 for support upon the keys 12.

The beehive may be covered at its top with a removable cover 29, which may be shifted transversely thereon, for providing for ventilation and access to the hive, or may be entirely removed. In order to prevent the bees from building the honey-comb so that it will project beyond the side planes of the comb-frames 28, it is desirable to provide a baffle, stop or partition which will so confine the bees in their operations as to limit their range of operation during the honey-comb building. In this instance there is shown in Fig. 12 a partition or stop, which consists of a number of parallel, spaced slats 30, the spacing 31 of which is preferably of just sufficient width to allow the bees to pass therebetween; the slats 30 being secured at their ends in suitable stiles 32, of such thickness on each side of the slats 30 as to provide vertical passageways in which the bees may move during the construction of the comb in the comb-frames. The ends of the partition stiles 32 are provided with lugs 33 for adjustment upon and between the keys 12 in the end walls of the comb box frames. The lateral spacing of the stop partitions 30 is clearly shown in Fig. 7.

One of the important features of the present invention is the provision of a simple, practicable, easily and quickly adjustable gate affording means for regulating and preventing the ingress and egress of bees from the hive. This means consists in combination with the bottom 4, of a gate 10, which is shown in Fig. 3 as comprising a unitary block, the ends of which are provided with tenons 35, slidably adjustable in the horizontal and vertical slots 6 and 9 in the forward ends 7 of the bottom 4. The gate 10 is of a thickness sufficient to extend from the bottom of the horizontal slots 6 to the top of the ends 7 and of a length sufficient to extend from side to side and is cut-away at its central portion to form an opening 36 of a width about one-half the length of the block 10. The cut-away portion 36 communicates with a chamber portion 37 of the block which opens with a mouth 38 of approximately one-third the length of the body of the block and on the opposite edge thereof from the depression or entrance notch 36. Longitudinally slidable in the body of the block is a pin or stopper 39, mounted in a chamber 40 therefor, and by means of which pin the passageway through the chamber 37 and mouth 38 may be carefully controlled as conditions require; the pin being adjustable toward one wall of the passageway 37, when necessary, so that only one bee at a time could find passageway therethrough.

As stated, the gate 10 is adjustable in diverse positions in the receiving slots 6 and 9, and in the drawings these positions are severally shown. In Fig. 1 the gate 10 is adjustable with its tenons 35 in the horizontal slots 6 and is pushed therein against the adjacent portion of the floor or bottom 4, which is chambered or cut-away to provide a mouth portion 4' beneath the edge of the lower hive box 2. The gate 10 is adjusted with its flat unencumbered edge uppermost and provides an entrance-way of maximum area for summer use, and in which position the chamber part 37 of the block is lowermost.

In Fig. 4 the gate 10 is adjusted with its flat surface vertical and with the chamber 37 disposed as a closure over the mouth 4' of the bottom 4 effectually cutting out ingress to and egress from the hive.

In Fig. 5 the gate 10 is shown in the same vertical position but elevated somewhat so as to act as a blind and wind shield to cut out the direct or reflected light rays from the entrance mouth 4' of the beehive.

In this view there are shown clearly pins 10', of which there is one at each end 7 of the hive floor, which pins are used for locking the gate 10 in any of its several positions.

In Fig. 6 the gate 10 is shown as adjustable in its horizontal position with the chamber 37 uppermost and with the mouth 38 of the gate coincident with the entrance 4' of the beehive floor 4. When in this position it is manifest the ingress and egress passageway of the hive is determined by the area of the mouth 38; this latter being further reduced in size, as may be required, by transversely shifting the throttle or stopper 39 as weather or other conditions may require.

The hive bottom 4 is shown in Fig. 1 as provided at one end with the entrance-way 4' and at the opposite end with a cut-away portion 41 inclined downwardly and outwardly and closable by a shutter 42 which is provided with a spring or snap lock 43 and hinged at 44 to the end of the floor 4. The upper portion of the opening 41, which extends transversely across the end of the floor, may be covered by a slidable, removable ventilator 45 through which a circulation of air is provided when the shutter 43 is turned to open position parallel with the length of the bottom 4.

As shown in Fig. 10 the bottom 4 may be reversed in its position beneath the hive boxes so as to present upwardly a shallow trough 46 extending approximately the length of the bottom and which is divided into a number of parallel stalls 47 by a plurality of parallel ribs 48, each of which is notched at 49 to permit the transverse flow of such food as may be supplied to the trough 46 through an opening at the end of the floor 4 when a plug or block 50 therein is removed. Thus all the ribs 48 which terminate adjacent to the charging opening closed by the block 50 are provided with sharpened ends 51, so that the food charged into the trough may divide into several streams to fill the stall chambers 47. If it be desired to charge only a few of the stalls, then the quantity of material supplied would be preferably limited to the capacity of the desired number of stalls at such depth as to prevent the transverse overflow at the equalizing notches 49, through which notches the food would flow at any time that the quantity of food is of sufficient quantity as to exceed the height of the bottom of the notches.

In Fig. 10 the ventilator 45 is shown as arranged over the entrance-way at one end of the hive and the gate 10 so adjusted that a restricted ingress is provided. Adjusted below an aperture 52 in the floor 4 is a trap screen 53 through which robber bees will pass into an entrapping chamber, as a jar 54. It is understood that the screen or ventilator 45 is omitted, as desired, to provide ingress to or egress from the beehive and the trap 53 may be adjusted to project upwardly into the beehive so as to permit ingress to and prevent egress therefrom.

The reversible partitions 30, when arranged at the sides of the hive walls, serve to produce ventilating space all around.

The cover or top can be removed and turned end for end and fits snugly upon the hive sections which are themselves reversible.

Having thus described my invention, what I claim and desire to secure by Letters Patent is—

1. In a beehive, hive chambers open at the top and bottom, a cover, a bottom, said chambers being reversible end for end and side for side, removable, independent hive frames, and removable supports in said chambers for supporting and locking said frames in the hive chambers.

2. In a beehive, hive chambers open at the top and bottom, a cover, a bottom, said chambers being reversible end for end and side for side, removable, independent hive frames, and removable supports in said chambers for supporting and locking said frames in the hive chambers, said supports providing for the removal of any of the frames in their respective chambers.

3. In a beehive, hive chambers open at the top and bottom, a cover, a bottom, said chambers being reversible end for end and side for side, removable, independent hive frames, removable supports in said chambers for supporting and locking said frames in the hive chambers, said supports providing for the removal of any of the frames in their respective chambers, and a device for holding the inserted frames in compact position upon the supports.

4. In a beehive, hive chambers open at the top and bottom, a cover, a bottom, said chambers being reversible end for end and side for side, removable, independent hive frames, removable supports in said chambers for supporting and locking said frames in the hive chambers, said supports providing for the removal of any of the frames in their respective chambers, a device for holding the inserted frames in compact position upon the supports, and a spring latch operating to hold the removable supports in position in the hive frames.

5. In a beehive, hive chambers open at the top and bottom, a cover, a bottom, said chambers being reversible end for end and side for side, removable, independent hive frames, removable supports in said chambers for supporting and locking said frames in the hive chambers, said supports providing for the removal of any of the frames in their respective chambers, a device for holding the inserted frames in compact position upon the supports, and a spring latch operating to hold the removable supports in position in the hive frames, said spring latch having a resilient arm engaging a complementary part on the hive frames so that the latch will remain steady in an open or a closed position.

6. A section for beehives comprising a box chamber open at the top and bottom and having parallel mortises on the inner faces of its end walls, honey frames with lugs at their ends, and keys slidably adjustable in said mortises for supporting and for locking the honey frames in a suspended position in said chamber and for permitting the removal of any of said frames irrespective of the positions of the others.

7. In a beehive, the combination with the beehive chamber, of a reversible floor.

8. In a beehive, the combination with the beehive chamber, of a reversible floor having on one side a feeding trough.

9. In a beehive, the combination with the beehive chamber, of a reversible floor having on one side a feeding trough divided into a plurality of longitudinally extending stalls.

10. In a beehive, the combination with the beehive chamber, of a reversible floor having on one side a feeding trough divided into a plurality of longitudinally extending stalls, the walls of said stalls being notched for the transverse distribution or flowage of food charged into the trough.

11. The combination with a beehive, of a floor provided at one end with an entrance-way beneath the superposed edge of the beehive chamber and at the opposite end with a ventilating aperture, and a screen-like ventilator thereover and communicating with the beehive chamber, and a shutter covering the ventilating aperture.

12. The combination with a beehive, of a floor provided at one end with an entrance-way beneath the superposed edge of the beehive chamber and at the opposite end with a ventilating aperture, a screen-like ventilator thereover and communicating with the beehive chamber, a shutter covering the ventilating aperture, and a spring latch for firmly holding the shutter in open or closed positions.

13. The combination with a beehive, of a floor provided at one end with an entrance-way beneath the superposed edge of the beehive chamber, the projecting end of the floor being provided with opposite vertical and horizontal mortises, and a gate removably adjustable in said mortises for controlling ingress to and egress from the hive.

14. The combination with a beehive, of a floor provided at one end with an entrance-way beneath the superposed edge of the beehive chamber, the projecting end of the floor being provided with opposite vertical and horizontal mortises, and a gate removably adjustable in said mortises for controlling ingress to and egress from the hive, said gate having a constricted mouth adjustable over the entrance-way.

15. The combination with a beehive, of a floor provided at one end with an entrance-way beneath the superposed edge of the beehive chamber, the projecting end of the floor being provided with opposite vertical and horizontal mortises, a gate removably adjustable in said mortises for controlling ingress to and egress from the hive, said gate having a constricted mouth adjustable over the entrance-way, and a member on the gate for reducing the area of said mouth.

16. The combination with a beehive structure provided with gate receiving means and a gate so designed as to provide, when adjusted over the entrance of the beehive, a large sized entrance aperture for summer use or a constricted aperture for winter use or for a shield and blind.

17. The combination in a beehive, of the beehive chamber, a plurality of comb-section receivers or holders, and means for laterally spacing said holders and acting as barriers against the action of bees in the holders, and providing for transverse movement from holder to holder and vertical movement along the sides of the holder and the adjacent surfaces of the honey-combs as erected.

18. The combination in a beehive, of the beehive chamber, a plurality of comb-section receivers or holders, and means for laterally spacing said holders and acting as barriers against the action of bees in the holders, and providing for transverse movement from holder to holder and vertical movement along the sides of the holder and the adjacent surfaces of the honey-combs as erected, said means comprising partitions with parallel, spaced slats.

19. The combination in a beehive, of the beehive chamber, a plurality of comb-section receivers or holders, and means for laterally spacing said holders and acting as barriers against the action of bees in the holders, and providing for transverse movement from holder to holder and vertical movement along the sides of the holder and the adjacent surfaces of the honey-combs as erected, said means comprising partitions with parallel spaced slats, and having end stile members with lugs adjustable between and upon supports in the hive chambers.

In testimony whereof I have hereunto set my hand in the presence of two subscribing witnesses.

CHRISTOF BACHMANN.

Witnesses:
  JOHN A. WALL,
  R. L. PAINE.

Copies of this patent may be obtained for five cents each, by addressing the "Commissioner of Patents, Washington, D. C."